(No Model.)

G. S. FOLLANSBEE.
MECHANICAL MOVEMENT.

No. 283,591. Patented Aug. 21, 1883.

Witnesses
A. O. Orne
Fred A. Powell

Inventor
George S. Follansbee
By Crosby & Gregory
Attys.

UNITED STATES PATENT OFFICE.

GEORGE S. FOLLANSBEE, OF CHARLESTOWN, MASSACHUSETTS.

MECHANICAL MOVEMENT.

SPECIFICATION forming part of Letters Patent No. 283,591, dated August 21, 1883.

Application filed February 2, 1883. (No model.)

*To all whom it may concern:*

Be it known that I, GEORGE S. FOLLANSBEE, of Charlestown, county of Suffolk, State of Massachusetts, have invented an Improvement in Mechanical Movements, of which the following description, in connection with the accompanying drawings, is a specification, like letters on the drawings representing like parts.

My invention relates to a mechanical movement having for its object to transmit different speeds to a shaft from adjacent driving-pulleys running at the same speed. This has been accomplished previous to this invention by means of gearing contained within the pulleys, which are mounted directly upon the driven shaft or concentric thereto, and so connected with the said shaft that the movement of one pulley involves the movement of the other.

In the present invention the driving-pulley for imparting the high speed rotates loosely upon the shaft of the pulley which imparts the slow speed, and each of the said pulleys actuates an independent train of gearing, terminating in a gear mounted loose on the main shaft to be driven, which has fixed upon it a ratchet-hub between the said gears of the two trains, which are provided with pawls for engaging the said hub in order to drive the shaft. The train of gearing for giving the slower speed consists in this instance of a pinion carried by the pulley-shaft and meshing with a larger internal gear carrying a pinion meshing with the gear upon the driven shaft, the said train thus imparting a less rotary speed than that derived from the belt, and the train for producing the higher speed consists merely of a gear connected with the pulley for giving the high speed, the said pulley and gear turning loosely on the shaft of the other pulley, and the gear meshing with the gear or pinion loose on the driven shaft. In transferring the belt from the loose or idle pulley it first runs onto the slow-speed pulley, thus rotating the gear upon the main shaft, and, by the pawls on the said gear and ratchet on the said shaft, causing the latter to rotate at a lower speed than that of the pulley and driving-belt, the other pulley and train of gearing then remaining motionless. The belt will then be run upon the high-speed pulley, setting the connected gearing in motion and driving the main shaft by the pawls and ratchet at the higher speed, the other train of gearing then remaining motionless.

Figure 1:
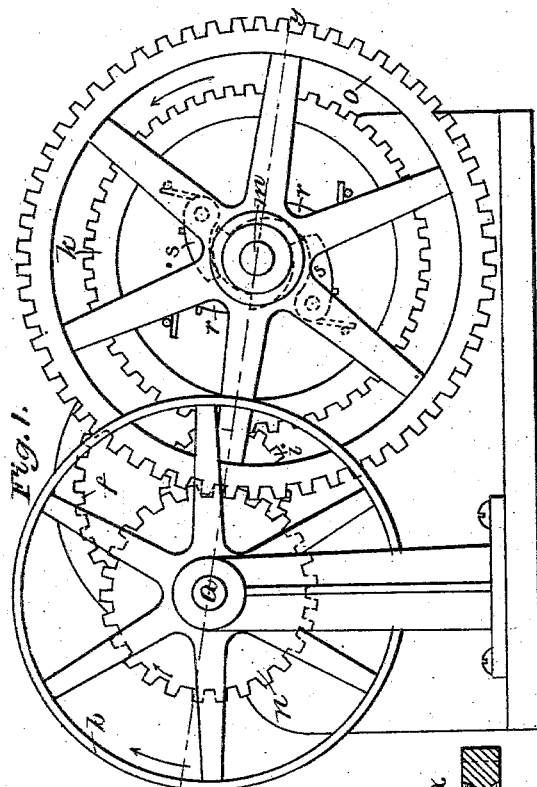
Figure 2:
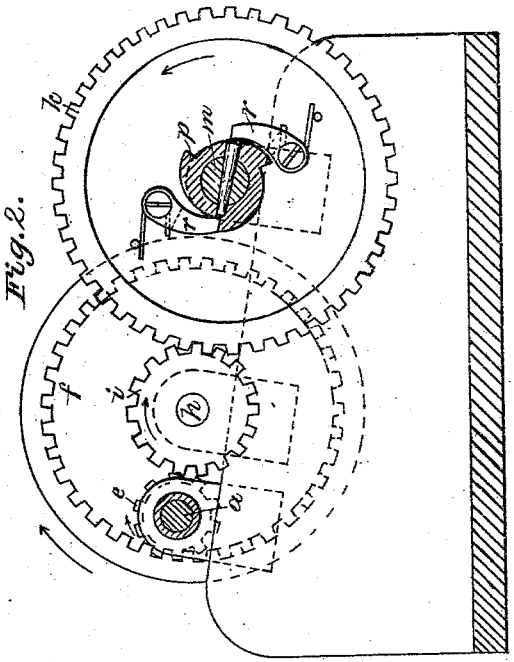
Figure 3:
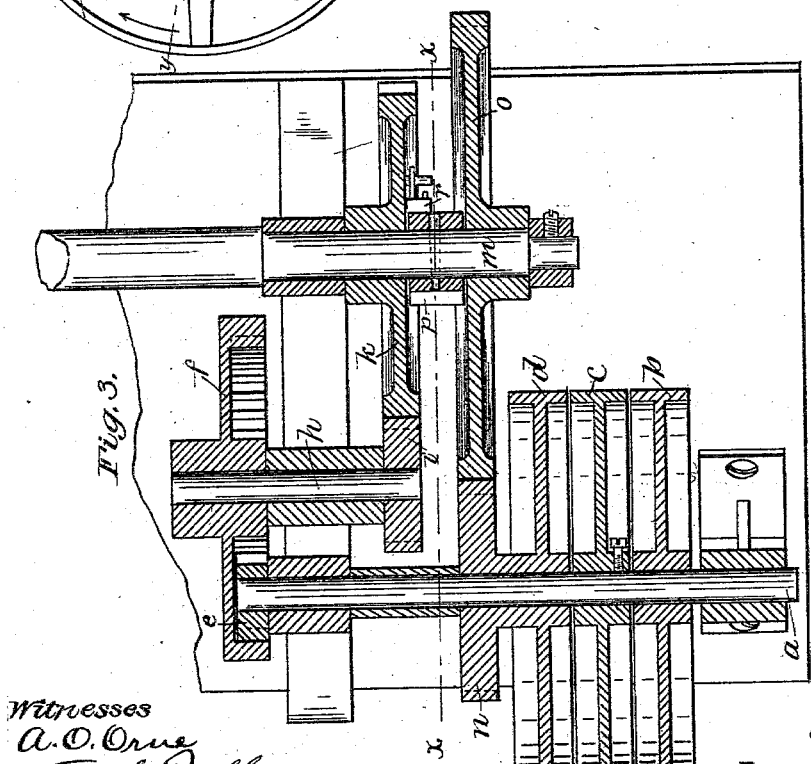

Figure 1 is a front elevation of a mechanical movement embodying this invention; Fig. 2, a vertical section thereof on line *x x*, Fig. 3, showing the low-speed train in elevation; Fig. 3, a section nearly horizontal on line *y y*, Fig. 1.

The pulley-shaft *a* has upon it the usual idle or loose pulley, *b*, the slow-speed driving-pulley *c* fixed thereon, and the high-speed driving-pulley *d* loose thereon, the said pulleys *b c d* thus having a common axis of rotation, and being adapted to turn independently of one another. The shaft *a* also has a pinion, *e*, fixed upon it, and thus rotated in unison with the pulley *c*, the said pinion meshing with an internal toothed gear, *f*, fixed on a shaft, *h*, having also fixed upon it a pinion, *i*, meshing with a gear, *k*, loose upon the main shaft *m* to be driven, the said gears and pinions *e f i k* constituting the slow-speed driving-train. The high-speed pulley *d*, having a loose or sleeve-like bearing upon the shaft *a*, has connected with it, or forming a part of it, a gear, *n*, meshing with a gear, *o*, also loose upon the main shaft *m*, which has a ratchet, *p*, fixed upon it between the gears *o* and *k*. It will be seen that rotation of the pulleys *c* and *d* in the same direction will cause the gears *k* and *o* to rotate in the same direction on the shaft *m*, as indicated by the arrows, and the said gears *k* and *o* are provided with pawls *r* and *s*, respectively, adapted to engage the common ratchet *p* independently, so that when either train of gearing is set in motion in the direction of the arrows thereon, Figs. 1 and 2, the said ratchet will be engaged and the main shaft *m* driven in unison therewith.

In operation, when the belt is transferred from the loose pulley *b*, it first passes onto the slow-speed pulley *c*, thus setting the train *e f i k* in motion, and the latter gear, *k*, by its pawls *r*, engaging the ratchet *p* and driving the main shaft *m* with a speed determined by proportions of the different wheels of the train. The high-speed train is not moved, as the shafts *a* and *m* turn loosely in the hubs of the gears *n* and *o*, and the movement of the ratchet $p$ is not in the proper direction to engage the pawls $s$. When, however, the belt in its further movement passes from the pulley $c$ to the pulley $d$, the gears $n$ and $o$ are set in motion, and the latter engages the ratchet $p$ by the pawls $s$, thus driving the shaft $m$ at a higher speed, determined by the proportions of the gears $n$ and $o$, the pawls $r$ then not being engaged by the teeth of the ratchet, which pass beneath the said pawls, so that the slow-speed train $e\ f\ i\ k$ remains at rest.

It is obvious instead of the pawls, their carrying-wheels, and ratchet, that I may use any well-known equivalent for causing the engagement of the gear-wheels with the main shaft when turning in one direction, but not in the other.

I claim—

1. The high and low speed driving-pulleys, adapted to turn independently upon a common axis, and independent trains of gearing actuated by the said pulleys, terminating in pawl-carrying wheels mounted loosely upon the main shaft, combined with the main shaft and ratchet fixed thereon, adapted to be engaged by the pawls of either of the said wheels, substantially as and for the purpose described.

2. The pulley-shaft and low-speed pulley and pinion both fixed thereon, combined with the internal toothed gear, the pinion connected therewith, the pawl-carrying gear loose on the main shaft, and ratchet fast thereon, substantially as described.

3. The pulley-shaft, pulley fixed thereon, and train of gearing actuated thereby, combined with the pulley loose on the said pulley-shaft, and train of gearing actuated thereby, and the main shaft actuated by either of the said trains of gearing independently of the other, substantially as described.

In testimony whereof I have signed my name to this specification in the presence of two subscribing witnesses.

GEO. S. FOLLANSBEE.

Witnesses:
 JOS. P. LIVERMORE,
 G. W. GREGORY.